Feb. 13, 1962   H. D. CUSICK   3,020,787
PIPE TAPERING TOOL
Filed Nov. 12, 1959
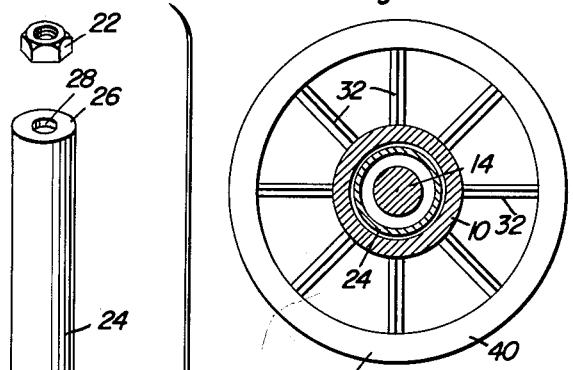
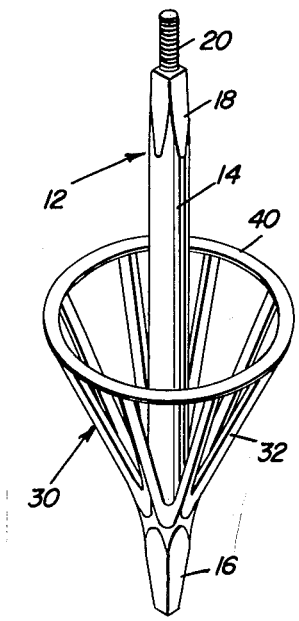
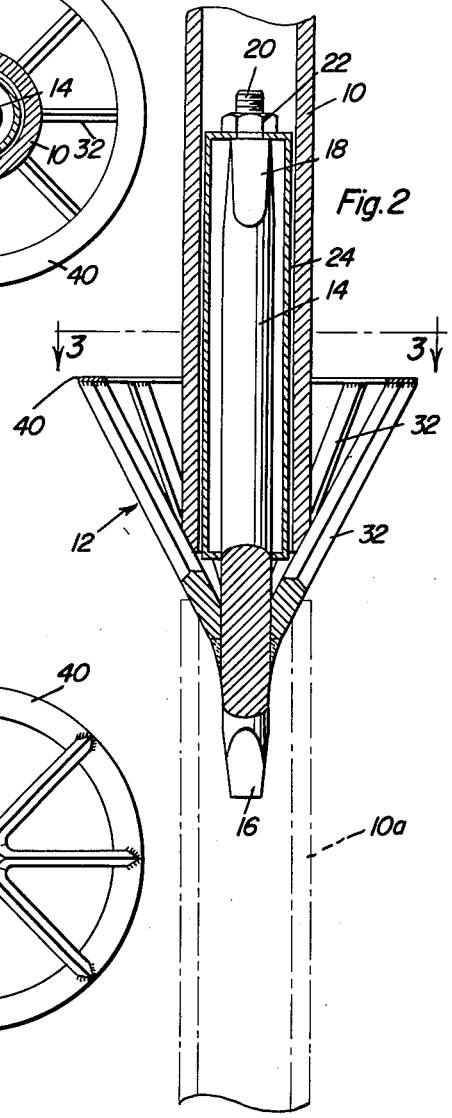
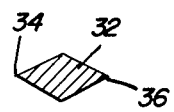
Herman D. Cusick
INVENTOR.

3,020,787
PIPE TAPERING TOOL
Herman D. Cusick, 2977 Merriman Road,
Medford, Oreg.
Filed Nov. 12, 1959, Ser. No. 852,341
4 Claims. (Cl. 77—73)

This invention relates generally to tools and more particularly to a double pipe reamer or tapering tool to form either inside or outside tapers on the ends of pipe, or pipe-like materials.

An object of the invention is to provide a reamer of a novel construction which is very easy to use and which serves the intended purpose effectively due to the construction of the reamer, the same reamer may be used with equal facility for tapering the inside or the outside edge of the end of a pipe, although the invention is not restricted for use solely with a pipe. A reamer in accordance with the invention may be used for reaming holes, although the principal application of the invention presently contemplated is in connection with the reaming of pipe ends.

Briefly, the reamer is made of a spindle to which a plurality of cutters are fixed at one end of each cutter. The cutters are arranged in a truncated conical organization with the narrow end of the arrangement formed by having the cutters welded or otherwise secured to the spindle, while the outer or larger diameter end of the arrangement has the knives supported by a ring.

The cutters have inner cutting edges and outer cutting edges so that they may be used for reaming the outer edge or the inner edge of a pipe end.

An important feature of the invention is found in the shank. Either end may be used in the conventional chuck of a turning tool, for instance a brace or drill. Further, one end of the handle has provision for holding a centering member thereon, this having application within a pipe when an outer bevel is being formed.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is an exploded perspective view of a reamer in accordance with the invention.

FIGURE 2 is an enlarged cross-sectional view of the reamer showing it in position for forming an outside bevel in full lines as to the pipe, and showing a dotted line position of the pipe when the reamer is being used to form an inside bevel.

FIGURE 3 is a cross-sectional view taken on the line 3—3 of FIGURE 2.

FIGURE 4 is an end view of the reamer.

FIGURE 5 is a cross-sectional view on an enlarged scale and taken on the line 5—5 of FIGURE 4.

In the accompanying drawings pipe 10 is shown in full lines (FIGURE 2) this being a typical workpiece. The pipe 10a is shown in dotted lines, and reamer 12 is illustrated in operative position with reference to pipe 10 and 10a, although it is to be clearly understood that the reaming tool is not used for making simultaneous bevels.

Reamer 12 includes only a few parts. There is a center spindle 14 having a chuck accepting non-circular end 16 and having a chuck accepting non-circular end 18. End 18 has a threaded stud 20 protruding therefrom and coaxial with the body of the spindle 14. Nut 22 is adapted to be secured to stud 20 in order to separably secure centering guide 24 on the spindle. The centering guide is made of a sleeve having an end wall 26 provided with an aperture 28 through which the stud 20 extends. Thereafter nut 22 may be attached to the stud 20 thereby holding the centering guide in place (FIGURE 2).

The cutter assembly 30 of the reamer is substantially conical and comprises a plurality of blades or cutters 32, each being four-sided (FIGURE 5) and elongate. The cross-section of the typical blade or cutter shown in FIGURE 5 is diamond-shaped, although this shape may be varied so long as there is an inside and an outside cutting edge 34 and 36 respectively. Each cutter is secured to shank 24 near end 16, for instance by being brazed or welded. The cutters are angled outwardly and have their outer ends braced by means of a ring 40 which is welded, brazed or otherwise fixed immovably to the outer ends of the cutters. The ring is concentric with handle 14 thereby retaining assembly 30 so that it has a generally truncated conical configuration.

In use, it is first assumed that an outside bevel is to be formed on the end of pipe 10. Centering guide 24 is secured to spindle 14 in the manner described previously. It is inserted in the bore of pipe 10, and the reamer pushed inwardly of the pipe until the edge of one end of the pipe is adjacent to the inner cutting edges of cutters 32. Assuming that the reamer is to be operated by another tool, it is connected with the tool by engagement of shank end 16 with the chuck of the turning tool. Then, the reamer 12 is simply rotated.

In order to form an inside bevel, the centering guide 24 is removed, and end 18 of spindle 14 engaged in the turning tool chuck. End 16 of the spindle is inserted within the bore of typical pipe 10a. Consequently, when the reamer is turned, the outer cutting edges of the cutters will be cut an inside bevel on the end of pipe 10a.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A combination inside and outside reamer comprising an elongate spindle having chuck receiving ends adapted for selective use in engagement with the chuck of a turning tool, a cutter assembly fixed to said spindle and having inner and outer cutting edges which are selectively positionable in engagement with the inner and outer edges of an end of a pipe whereby upon rotation of said spindle either inner or outer bevels are formed on the end of the pipe, said cutter assembly consisting essentially of a plurality of cutters having inner ends fixed to said spindle between the ends thereof and diverging outwardly, the outer ends of said cutters spaced laterally from the longitudinal axis of said spindle to form the generally truncated conical configuration of the cutter assembly, means secured to said outer ends of said cutters to brace said cutters and form a rigid assembly thereof, a centering guide adapted to be inserted in a pipe when an outside bevel is being formed on one end of the pipe, said centering guide including a sleeve, and means connected with said spindle for separably securing said sleeve to said spindle with said sleeve surrounding a portion of said spindle and located between portions of said cutters and said spindle immediately laterally adjacent to said cutters.

2. A reamer in accordance with claim 1, wherein said sleeve includes an apertured end wall abutting one end of the spindle, said means comprising a threaded longitudinal shank on said one end of said spindle projecting through said end wall, and a retaining nut for the sleeve threaded on said shank.

3. A reamer in accordance with claim 1, wherein said means includes a threaded longitudinal shank on one end of the spindle, said sleeve being removable and spaced concentrically from the spindle and comprising an apertured end wall mounted on the shank in abutting engagement with said one end of said spindle, and a retaining nut for the sleeve threaded on the shank.

4. An inside and outside reamer comprising an end-for-end reversible spindle insertable in a pipe, a substantially conical cutter assembly fixed on an intermediate portion of the spindle and including a plurality of outwardly and longitudinally divergent blades, a centering guide comprising a sleeve mounted longitudinally on one end portion of the spindle in spaced, concentric relation thereto and extending into the cutter assembly, said sleeve being freely slidable in the pipe and including a closed outer end, and threaded means on said one end portion of the spindle engaged with said closed outer end of said sleeve for securing said sleeve on said spindle.

References Cited in the file of this patent

UNITED STATES PATENTS

| | | |
|---|---|---|
| 1,228,951 | Morton | June 5, 1917 |
| 2,453,848 | Livingston et al. | Nov. 16, 1948 |
| 2,865,237 | Degenhart | Dec. 23, 1958 |

FOREIGN PATENTS

| | | |
|---|---|---|
| 889 | Great Britain | 1911 |